United States Patent
Tanaka et al.

(10) Patent No.: US 6,290,580 B1
(45) Date of Patent: Sep. 18, 2001

(54) POLISHING METHOD FOR SILICON WAFERS WHICH USES A POLISHING COMPOUND WHICH REDUCES STAINS

(75) Inventors: Hiroaki Tanaka, Narashino; Akitoshi Yoshida, Chiba; Yoshihisa Ogawa, Chiba; Yusuke Inoue, Chiba; Shunji Hakomori, Tokyo, all of (JP)

(73) Assignee: Speedfam-pec Co Ltd, Kanagawa-pref (JP)

( * ) Notice: Subject to any disclaimer, the term of this patent is extended or adjusted under 35 U.S.C. 154(b) by 0 days.

(21) Appl. No.: 09/390,772

(22) Filed: Sep. 7, 1999

(30) Foreign Application Priority Data

Sep. 7, 1998 (JP) ................................. 10-252564

(51) Int. Cl.$^7$ ..................................... B24B 1/00
(52) U.S. Cl. ............................... 451/44; 451/289
(58) Field of Search .................. 451/41, 44, 288, 451/285, 287, 290, 289; 51/309, 308, 307; 106/3; 252/79.3; 438/692, 693

(56) References Cited

U.S. PATENT DOCUMENTS

| | | |
|---|---|---|
| 3,715,842 | 2/1973 | Tredinnick et al. . |
| 4,918,869 * | 4/1990 | Kitta ..................................... 51/131.1 |
| 5,228,886 | 7/1993 | Zipperian . |
| 5,264,010 | 11/1993 | Brancaleoni et al. . |
| 5,514,025 * | 5/1996 | Hasegawa et al. ..................... 451/44 |
| 5,670,011 * | 9/1997 | Togawa et al. ....................... 156/345 |
| 5,693,239 | 12/1997 | Wang et al. . |
| 5,733,819 | 3/1998 | Kodama et al. . |
| 5,759,917 * | 6/1998 | Grover et al. ........................ 438/690 |
| 5,783,489 * | 7/1998 | Kaufman et al. ..................... 438/692 |
| 5,885,135 * | 3/1999 | Desorcie et al. ........................ 451/41 |
| 5,891,205 | 4/1999 | Picardi et al. . |
| 5,928,066 * | 7/1999 | Hasegawa et al. .................. 451/173 |
| 5,968,239 | 10/1999 | Miyashita et al. . |
| 5,980,775 * | 11/1999 | Grumbine et al. ................... 252/79.1 |
| 5,997,620 | 12/1999 | Kodama et al. . |
| 6,027,669 | 2/2000 | Miura et al. . |
| 6,077,385 * | 6/2000 | Kimura et al. ....................... 156/345 |
| 6,099,604 | 8/2000 | Sandhu et al. . |
| 6,106,728 | 8/2000 | Iida et al. . |
| 6,110,832 | 8/2000 | Morgan, III et al. . |
| 6,117,783 | 9/2000 | Small et al. . |
| 6,120,361 * | 9/2000 | Konishi et al. ....................... 451/287 |
| 6,146,241 * | 11/2000 | Lee et al. ................................. 451/5 |

* cited by examiner

*Primary Examiner*—Joseph J. Hail, III
*Assistant Examiner*—Dung Van Nguyen

(57) ABSTRACT

The present invention provides a polishing compound which does not make stain grow on the surface of work-piece comprising, the dispersion containing 1–30 wt. % of metal oxide particles having 8–500 nm average diameter, acid or alkali and salt, and whose pH is 7–12. Desirably said polishing compound is the compound in which water soluble organic solvent is contained. Further, present invention provides edge polishing method and surface polishing method by use of said polishing compound.

7 Claims, No Drawings

POLISHING METHOD FOR SILICON WAFERS WHICH USES A POLISHING COMPOUND WHICH REDUCES STAINS

BACKGROUND OF THE INVENTION

1. Field of the Invention

The present invention relates to a polishing compound which does not remain stain on the surface of work piece used for the surface and edge polishing of the semiconductor substrate such as silicon wafer, further relates to an edge and surface polishing method by said polishing compound.

2. Description of the Prior Art

Electric parts such as IC, LSI, or VLSI which are made from semiconductor materials e.g. silicon mono crystalline are produced as follows. That is, an ingot of silicon mono crystalline or other compound semiconductor is sliced to a thin wafer, precise electrical circuit pattern is formed on the surface of water and divided to chips. Then, IC, LSI, or VLSI are prepared based on the chip. An as cut wafer which is prepared by slicing an ingot is lapped, etched and polished as to processed to a mirror finished wafer at least one side of which is mirror finished. As the holding method of a wafer at the wafer polishing process, a grasping method, a vacuum attracting method and a holding down method by wind pressure can be used and a tool which meets to each methods can be applied.

As the abrasives to be used for the polishing, a fine particle of an oxide of metal such as silicon, aluminum, cerium, zirconium or manganese can be mentioned. Especially, as an abrasive for the polishing of silicon wafer, a fine particle of silicon oxide is preferably used. Said particle of silicon oxide is dispersed into alkaline aqueous solution by colloidal state and forms a stable polishing compound. The term of silicon wafer in this invention indicates a basic bare wafer, an epitaxial wafer, a wafer which is covered by an oxide or a nitrated film, SOI wafer which is covered by an insulated film and a semiconductor wafer for CMP (chemical mechanical polishing).

At the polishing procedure, lined, speckled or striped whity stains are grown on the surface of tools and wafer when the polished surface is dried up, which not only hurts markedly the appearance of a mirror finished wafer, but also deteriorate the yield of the product. To avoid said problem, the additional washing procedure is needed, or a special treatment for example to keep a wafer wet is needed. The mentioned phenomenon is especially remarkable at the edge polishing procedure of silicone wafer or the surface polishing procedure of semiconductor device, and the solving of said problem had been strongly desired.

In general, the edge polishing procedure of this invention is carried out by following method. Namely, on the surface of a rotatable dram of edge polishing machine, polishing pad such as resin foam, synthetic leather or nonwoven cloth are wound and stuck, the edge part of silicon wafer whose edge is chambered is pressed to the rotating drum with necessary angle by rotating with constant supply of aqueous solution of polishing compound composed mainly by colloidal silica. Thus the polishing of the outermost periphery edge of a wafer is carried out. As a tool to hold the wafer in this edge polishing procedure, a grasping tool which simply press or nip the wafer or a vacuum attracting tool are mainly used. In the case of this edge polishing method, growth of a stain on a wafer at the point or surrounded area which said tools contact is pointed out, further, the stain grows along with the shape of the vacuum attracting tool.

And, at the polishing of an ordinary wafer (brand wafer) or a semiconductor device wafer, a slurry composed of ordinary loose abrasive is used as abrasives and a polishing machine possessing a rotating platen on which polishing pad made of resin foam, synthetic leather or nonwoven cloth is stuck is used. In this case, a wafer is fixed to a pressure plate by a vacuum attracting method, by a sticking method along with the shape of carrier ring or by a method to press the wafer to polishing pad by high pressure air, and in these methods the problem of stain growth at the contact point of tool is pointed out too. At the edge polishing and also at the surface polishing, it is necessary to extend the washing time or to use excess washing water to avoid the growth of stain.

In general, as the abrasives which is used for silicon wafer polishing, fine particles of silicon oxide can be mentioned. As the fine particles of silicon oxide, several kinds of colloidal silica can be mentioned. For example, colloidal silica which prepared by removing sodium from aqueous solution of sodium silicate by ion transferring resin and growing up as the colloid size silicon oxide fine particles, colloidal silica prepared by hydroxide of alkyl silicate such as ethyl silicate or methyl silicate and growing up as the colloid size silicon oxide fine particles and colloidal silica obtained by dispersing the fumed silica produced from silicon tetrachloride into water can be mentioned. To the water dispersion of these colloidal silica, adequate amount of additives such as alkaline component, buffering agent or dispersing agent are added, and the obtained solution is generally used as the polishing compound for silicon wafer.

The polishing method which uses the polishing compound of above mentioned composition is quite different from the mechanical process which uses for example diamond grinding stone, or alumina type abrasives. This method utilizes the chemical action of alkali to the silicon wafer, concretely utilizes the corrosive action of alkali to the silicon wafer. That is, the thin corroded layer is formed by the corrosive action of alkali on the surface of silicon wafer and said layer is removed by the mechanical rubbing action of fine particles of colloidal silica, which is so called mechano-chemical action. The polishing is proceeded by the chemical action which alkaline component of the solution has, therefore it is necessary to maintain pH of polishing compound solution bigger than 7 region. When pH of the solution is closer to 7 (neutral), the chemical action to the silicon wafer is reduced and also the polishing speed is deteriorate, on the contrary, when pH is closed to the strong alkaline region of over than 10 the chemical action becomes strong and the polishing speed becomes faster.

In such kind of polishing compound, the fine particles of silicon oxide are dispersed in aqueous solution, and the solution of polishing compound is easily dried up by heat accompanied with the processing or by the contact with dried air, and fine particles of silicon oxide gel remains on the surface of a wafer and appears as the whity stain. Further, small portion of wafer and fine particle of silicon oxide are solved in alkaline component, and when the polishing compound is partially remained on the surface of polished wafer, the dried up products of them acts as an etchant (solve promotion agent) and causes a speckled type stain.

OBJECT OF THE INVENTION

The inventors of this invention have carried out an intensive study to make clear the cause of whity stain grows on the polished wafer after polishing process and to investigate the countermeasure for growth of the stain, and found that the polishing compound which has specific composition can prevent the deposition of solid and drying up of it and effectively control the growth of whity stain, and accomplished the present invention. That is, the object of this invention is to provide a polishing compound which does not remain the whity stain at the polishing process of silicon wafer, further the another object of this invention is to provide a polishing method and an edge polishing method of silicon wafer by use of said polishing compound.

BRIEF SUMMARY OF THE INVENTION

Above mentioned object can be accomplished by a polishing compound which does not remain stain on the surface of work-piece comprising, the dispersion containing 1–30 wt. % of metal oxide particles having 8–500 nm average diameter, acid or alkali and salt, whose pH is 7–12. Desirably said polishing compound is the compound in which water soluble organic solvent is contained.

Further, the another object of this invention can be accomplished by an edge polishing method of silicon wafer, pressing the edge of rotating silicon wafer by inclined state to the rotating drum of edge polishing machine whose surface is covered with a polishing pad, under the supply of said polishing compound, and by a polishing method of silicon wafer, grasping a silicon wafer by a vacuum attracting method to a carrier of a polishing machine having a rotatable platen on which polishing pad such as porous resin sheet, synthetic leather sheet or nonwoven cloth is stuck, and rotating at least one of said platen and said silicon wafer under the constant supply of said polishing compound. Furthermore, the other object of this invention can be accomplished by a chemical mechanical polishing method of semiconductor device comprising, grasping a semiconductor device wafer by a vacuum attracting method or a holding down method by wind pressure to a carrier of a polishing machine having a rotatable platen on which polishing pad such as porous resin sheet, synthetic leather sheet or nonwoven cloth is stuck, and rotating at least one of said platen and said semiconductor device wafer under the constant supply of said polishing compound.

DETAIL DESCRIPTION OF THE INVENTION

The average diameter of fine particles of metal oxide used in this invention is 8–500 nm, desirable is 30–250 nm and the desirable kind of metal oxide is a colloidal silica. When the average diameter of it is smaller than 8 nm, fine particles of colloidal silica are easily cohered and the stability as the polishing compound deteriorates. When the average particle size of silicon oxide is bigger than 500 nm, the constant production as an abrasive product is very difficult and is unprofitable from the view point of price, further, the particle size is out of colloidal region. The concentration of silicon oxide fine particles is 1–30 wt. %, and is 1–20 wt % at the practical polishing use, desirably 1–15 wt. %. When the concentration at the practical use is lower than 1 wt. % the polishing speed becomes very low and can not be practically used. On the contrary, the polishing speed is improved along with the increase of the concentration of silicon oxide and when the concentration reaches to about 15 wt. % level, the polishing speed reaches to the saturated point and is not improved any more beyond this point. Further, when the concentration is higher than 30 wt. %, fine particles of silicon which generates as the polishing chips and oxidized and are added to the recycling solution and quickens the gelation. The colloidal solution become unstable and the recycling use of the polishing compound is remarkable deteriorated, further the growth of whity stain becomes more remarkable.

In this invention, it is necessary that pH of the polishing compound is in the region of 7–12, desirably in the region of 8–11.5. If it is lower than 7, the solution does not act as a polishing compound, and if pH becomes higher than 11.5, the polishing compound becomes unstable because the colloidal solution has a tendency to flocculate and is out of the practical use.

In this invention, the effect to prevent the growth of whity stain which is the object of this invention can be remarkable improved by containing water soluble organic solvent, for example mono hydric alcohol, polyhydric alcohol or organic compound which possesses hydroxyl group. Especially, polyhydric alcohol such as high molecular weight alcohol or glycol is suited to the polishing compound of this invention, because these are the compound which are not easily evaporated. As the desirable concrete example, ethylene clycol, polyethylene glycol, glycerin and hydroxydiethylamine can be mentioned.

In the polishing compound of this invention, acid or alkali and salt are contained. And, the important point is that, by the combination of them pH of the compound is maintained within the region of 7–12, desirably 8–11.5. The acid to be used in this invention is desirably at least one selected from the group composed by acetic acid, oxalic acid, sulfuric acid, formic acid, lactic acid, hydrochloric acid, nitric acid and phosphoric acid and the desirable contents of acid is 0.05–5 wt. % to the total amount of the polishing compound. Further, the alkali is used in this invention is desirably at least one selected from the group composed by organic alkali such as primary amine, secondary amine, tertiary amine and quaternary ammonium hydroxide or inorganic alkali such as sodium hydroxide, potassium hydroxide, lithium hydroxyide and ammonia, and the desirable contents of alkali is 0.05–5 wt. % to the total amount of the polishing compound.

As a salt to be added to the polishing compound of this invention, the salt obtained by the combination of strong acid and strong base, weak acid and strong base, strong acid and weak base, weak acid and weak base can be mentioned, and added salts acts as a buffering solution which stabilizes pH of the polishing compound. The kinds of salt can be selected considering the kind and amount of acid or alkali contained in the polishing compound. As the desirable example of salt to be added, a salt composed of organic alkali such as primary amine, secondary amine, tertiary amine and quaternary ammonium hydroxide or inorganic alkali such as sodium hydroxide, potassium hydroxide, lithium hydroxide and ammonia and acid selected from the group composed by acetic acid, oxalic acid, sulfuric acid, formic acid, lactic acid, hydrochloric acid, nitric acid, carbonic acid and phosphoric acid can be mentioned, however, not intended to be limited to them. It is important to add the salt so as to rise the electronic conductivity of the dispersion.

The concrete example of the best combination of each components and amount contained in the polishing compound of this invention is indicated as follows. That is, as the abrasive, colloidal silica which disperse silicon oxide fine particle of 30–250 nm average diameter can be mentioned, which contains a salt composed by carbonic acid or phosphoric acid and alkali metal and quaternary ammonium hydroxide whose carbon number is smaller than 16 as the alkali component, and pH of which is within the region of 8–11. When this polishing compound is used for the polishing of silicon wafer, since pH change is small and does not rise to abnormally high level at the polishing procedure, the abnormal corrosion of silicon which causes the stain does not occur and the growth of whity stain is very small.

Further, as the additives to be used in this invention, a surface surfactant, a defoaming agent, an antseptic agent and viscosity rising agent can be mentioned. To improve the quality of the polishing compound of this invention and to attempt further improvement of the polishing method, a surface surfactant, a dispersing agent and an anti sedimentation agent can be used together with. As the anti sedimentation agent, water soluble organic compound or inorganic layer structure compound can be mentioned. Further, although the polishing compound of this invention is aqueous dispersion, it is possible to add organic solvent. The polishing compound of this invention can be prepared by adding acid, alkali and salt to the dispersion of fine particles of metal oxide such as colloidal silica, and the order to add is not restricted.

DETAIL DESCRIPTION OF THE EXAMPLE

The polishing compound and the polishing method with use of said polishing compound of this invention will be understood more readily with reference to the Examples and Comparative Examples, however these Example are only intended to illustrate the invention and not be construed to limit the scope of the invention.

Example 1-3, Comparative Example 1-3

As a work-piece, silicon wafer of 8 inches diameter is used, and a mirror finish polishing experiments of edge part are carried out according to the following method and conditions, then washed immediately and the stain on the surface is inspected.

Polishing machine: EP-200-IV type edge polishing machine (product of Speedfam: Ipec Co., Ltd.)
Inclines angle of wafer: 45 degree
Rotating speed of drum: 800 RPM
traverse speed of drum: 30 mm/min
Wafer grasping method: vacuum attracting method
Degree of vacuum of lower fastener: 200 mmHg
Polishing pad: SUBA400 (product of Rodel Nitta Co., Ltd.)
Flow rate of polishing compound: 250 ml/min
Polishing time: 5 min
Work-piece: 8 inches silicon wafer
Washing after polished: use an automatic wafer washer, scrubbed by a nylon brush with DI water spray for 20 minutes, then wiped by wiping paper and left for 2 minutes at room temperature.
Evaluation of stain: surface of wafer is observed by the naked eye of inspector under the strong light of a lamp, and evaluated the area and darkness of stain. Each specimen are evaluated by ranking from A to F, wherein
A: no stain is observed (good)
F: remarkable stains are observed (bad)

The polishing compound used in the Example 1 is prepared by following procedure. As the colloidal silica, the product of 50 nm average diameter and 30 wt. % concentration which is on market is used. 3.5 kg of said colloidal silica is poured into a 20 liter size SUS beaker, then 6 kg of water is added and stirred for 5 minutes by a stirrer. 70 g of 10 wt. % KOH aqueous solution is added by constant stirring, and after 5 minutes 16 g of ammonium nitrate is added. Continue constant stirring for another 5 minutes, then 70 g of ethylene glycol is added. After 10 minutes stirring, adjusted to 10 kg by adding DI water and stirred for 2 minutes. Thus the aimed polishing compound is obtained. Other polishing compounds are prepared by similar procedure.

The composition and physical property of used polishing compound and inspection results of edge polished wafer are summarized in Table 1.

TABLE 1

| | Ex. 1 | Co. Ex. 1 | Ex. 2 | Co. Ex. 2 | Ex. 3 | Co. Ex. 3 |
|---|---|---|---|---|---|---|
| abrasives | colloidal silica | | colloidal silica | | colloidal silica 3/ fumed silica 1 | |
| diameter | 50 nm | | 30 nm | | 90 nm | |
| weight % | 10.5 | | 5.0 | | 8.0 | |
| acid base wt % | | | | | | |
| HCl | | | | | 0.02 | |
| KOH | 0.07 | | | | | |
| TMAOH* | | | 0.13 | | | |
| $NH_4NO_3$ wt % | 0.16 | | | | | |
| $CH_3COONH_4$ | | | | | 0.20 | |
| $KHCO_3$ wt % | | | 0.15 | | | |
| EG** wt % | 0.5 | | | | | |
| pH of compound | 8.7 | 8.5 | 10.5 | 9.7 | 10.2 | 9.3 |
| stain | A | D | C | E | B | F |

*tetramethylammonium hydroxyde
**ethylene glycol

Example 4-6, Comparative Example 4-6

As the work piece, semiconductor device wafer (silicon wafer with oxidation film) is used, and the surface planariaztion polishing is carried out according to the method mentioned below. After the washing, the polished work piece is dried up and the state of the stain is evaluated.

Polishing machine: SH-24 type polishing machine, (product of Speedfam, Ipec Co., Ltd.)
Rotating speed of platen: 60RPM
Wafer grasping method: vacuum attracting method
Degree of vacuum of carrier fastener: 50 mmHg
Rotating speed of wafer carrier: 120 RPM
Polishing pad: SUBA600 (product of Rodel Nitta)
Flow rate of polishing compound: 60 ml/min
Polishing time: 3 min
Work piece: 6 inches silicon wafer with oxidation film
Washing after polished: washed for 30 seconds by city water and wiped by wiping paper and left in room temperature for 2 minutes
Evaluation of stain: surface of wafer is observed by the naked eyes of inspector under the strong light of lamp, and evaluated the area and darkness of stain. Each specimen are evaluated by ranking from A to F, wherein
A: no stain is observed (good)
F: remarkable stains are observed (bad)

The polishing compound used in these Example are prepared based on the procedure illustrated in Example 1. The composition and physical property of used polishing compound and inspection results of edge polished wafer are summarized in Table 2.

TABLE 2

| | Ex. 4 | Co. Ex. 4 | Ex. 5 | Co. Ex. 5 | Ex. 6 | Co. Ex. 6 |
|---|---|---|---|---|---|---|
| abrasives | fumed silica | | fumed alumina | | colloidal silica | |
| diameter | 90 mn | | 120 nm | | 150 nm | |
| weight % | 7.0 | | 8.0 | | 8.0 | |
| acid base wt % | | | | | | |
| LA*** | | | | | 0.16 | |
| $NH_4OH$ | 0.37 | | | | | |

TABLE 2-continued

|  | Ex. 4 | Co. Ex. 4 | Ex. 5 | Co. Ex. 5 | Ex. 6 | Co. Ex. 6 |
|---|---|---|---|---|---|---|
| TMAOH* |  |  | 0.2 |  |  |  |
| $NH_2NO_3$ wt % |  |  |  |  | 0.20 |  |
| $CH_3COOK$ wt % | 0.16 |  |  |  |  |  |
| $NH_4HCO_3$ wt % |  |  | 0.27 |  |  |  |
| glycerin wt % | 0.05 |  |  |  |  |  |
| pH of compound | 9.6 | 7.4 | 11.2 | 9.4 | 8.7 | 9.1 |
| stain | A | D | B | E | C | F |

*tetramethylammonium hydroxyde
***$CH_3CH(OH)COOH$ (lactic acid)

It is obvious form the experimental results of Table 1 and Table 2 that the polishing compound of the Examples of this invention does not grow whity stain on the polished surface of work piece, especially the polishing compound in which water soluble organic solvent is contained indicates excellent results.

Effect of the Invention

The growth of lined, speckled or striped whity stains which appears at an edge polishing procedure of silicon wafer and a surface planarization polishing procedure of semiconductor device wafer is becoming a big problem. The polishing compound of this invention solves said problem, and by use of this compound burden to the washing process can be remarkably reduced, furthermore, the productivity for the intermediate product can be improved. That is, the usefulness of this invention is obvious.

What is claimed is:

1. A method for polishing an edge of a silicon wafer, comprising bringing the edge to be polished into contact with a polished compound comprising an aqueous dispersion comprising from 1 to 30 wt. % of metal oxide particles having an average particle diameter of from 8 to 500 nm, alkali or acid, salt, and a water soluble organic solvent selected from the group consisting of monohydric alcohol, polyhydric alcohol and hydroxyl group containing organic compound, said dispersion having a pH of from 7 to 12, and continuing the contact until the edge is polished, whereby formation of a whitish residue on the polished wafer is substantially reduced.

2. The method according to claim 1, wherein said aqueous dispersion contains at least one acid selected from the group consisting of acetic acid, lactic acid, hydrochloric acid, nitric acid, carbonic acid and phosphoric acid.

3. The method according to claim 1, wherein said aqueous dispersion contains at least one alkali selected from the group consisting of primary amine, secondary amine, tertiary amine, quaternary ammonium hydroxide, sodium hydroxide, potassium hydroxide, lithium hydroxide and ammonia.

4. The method according to claim 1, wherein said salt is a salt of an alkali selected from the group consisting of primary amine, secondary amine, tertiary amine, quaternary ammonium hydroxide, sodium hydroxide, potassium hydroxide, lithium hydroxide and ammonia, and an acid selected from the group consisting of acetic acid, oxalic acid, sulfuric acid, formic acid, lactic acid, hydrochloric acid, nitric acid, carbonic acid and phosphoric acid.

5. The edge polishing method of claim 1, wherein said step of bringing the edge to be polished into contact with a polishing compound, comprises inclining and rotating the silicon wafer, and pressing the edge of the rotating inclined wafer to a polishing pad on a rotating polishing drum of an edge polishing machine, and supplying said polishing compound to the polishing pad to cause said edge polishing.

6. The edge polishing method of claim 1, wherein said step of bringing the edge to be polished into contact with a polishing compound, comprises applying a vacuum to grasp said silicon wafer, bringing the grasped silicon wafer into contact with a polishing pad carried by a rotatable platen of a polishing machine, rotating at least one of said silicon wafer and said rotatable platen, and providing a constant supply of said polishing compound to cause said edge polishing.

7. The edge polishing method of claim 1, wherein said silicon wafer is a semiconductor device wafer and wherein said step of bringing the edge to be polished into contact with a polishing compound, comprises, securing the semiconductor device wafer under vacuum or air pressure and causing said secured wafer to come into contact with a polishing pad held on a rotatable platen of a polishing machine, and rotating at least one of said semiconductor device wafer and said rotatable platen, under a constant supply of said polishing compound to thereby cause chemical mechanical edge polishing of said device wafer.

* * * * *